Dec. 4, 1956  J. B. WALKER  2,772,600
IMAGE SUPERIMPOSITION APPARATUS
Filed Aug. 3, 1953  2 Sheets-Sheet 2

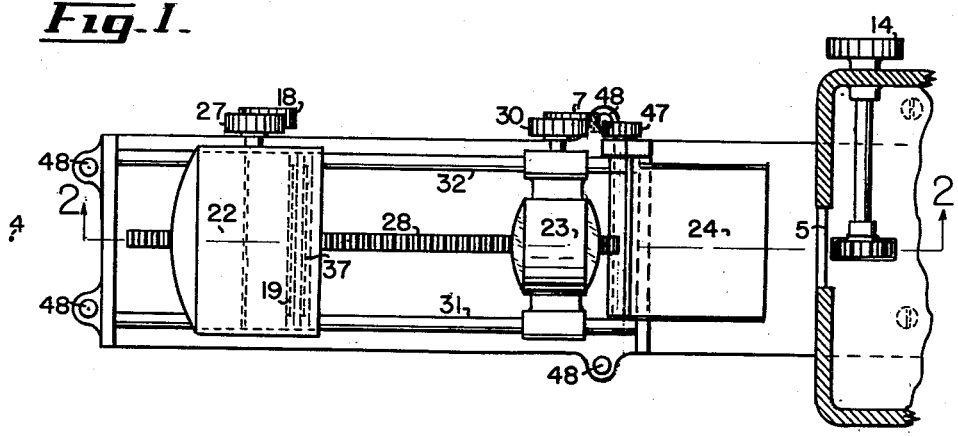
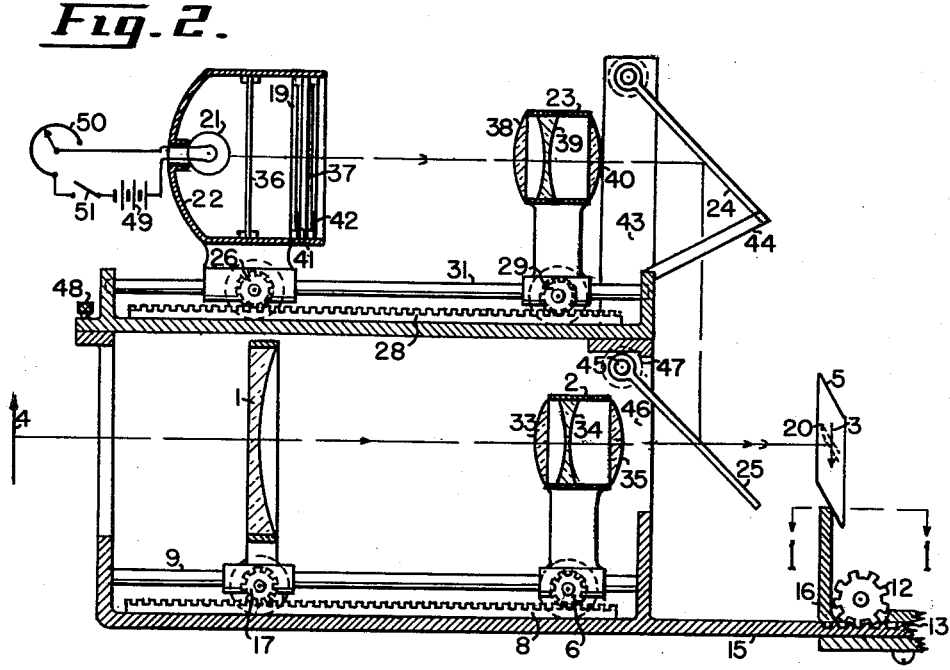

INVENTOR.
JOSEPH B. WALKER
BY Harry R. Lubcke
AGENT

2,772,600

IMAGE SUPERIMPOSITION APPARATUS

Joseph B. Walker, Los Angeles, Calif.

Application August 3, 1953, Serial No. 371,881

2 Claims. (Cl. 88—24)

This invention relates to means for optically superimposing images in arts such as motion pictures, television and the like in which artistic backgrounds are provided for living performers from transparencies or opaque pictures or in which advertising matter is superimposed upon any desired scene.

The prior art has been required to use relatively bulky arrangements comprising a plurality of large mirrors and near life-like properties so that the camera lens system would focus upon the auxiliary scene with the same adjustment as that required for the main scene. At other times in the television art it has been necssary to utilize two television cameras and two operators, taking one scene with one camera and a second scene with the other and combining the images by electrical combination of the image signals. This arrangement is obviously wasteful of equipment and personnel and uncertain as to result, since the relative placement and magnification of the two images is under the manipulation of two separate operators who are usually unable to see the work of each other and must be guided by verbal coaching from a third person, the technical supervisor.

With my invention the superimposed image is produced in one camera, the result is seen by the camera operator on his monitor and adjustments of either scene can be made by him. Because of the pressing demands of the time element in live television the facility with which my apparatus may be used represents an important "last step" in bringing about widespread use of a new technique which heretofore has been of doubtful practical value because of complexity.

In my copending application for Image Superimposition Device, Serial No. 353,968, now Patent No. 2,729,-141, I have disclosed a means for eliminating the bulk of the prior art arrangements and have accomplished other objects apparent to one skilled in the art. My present invention departs from that of my copending application in that a wide "zoom" range is provided. This I have accomplished by altering the position of the image-combining half-silvered mirror, by changing the focal lengths of the lens elements of the superimposition optical system, by providing an accessory mirror and by altering the relation of the parts in the apparatus.

An important object of my invention is to provide compact image superimposition apparatus capable of a relatively wide range of change in magnification.

Another object of my invention is to provide image superimposition apparatus of relatively simple construction.

Another object of my invention is to provide superimposition apparatus having elements of identical or similar size and shape, resulting in economy in manufacturing.

Another object of my invention is to provide superimposition apparatus that is automatically adjusted.

Another object of my invention is to provide superimposition apparatus capable of accomplishing related effects in combination with the image superimposition.

Other objects of my invention will be apparent upon reading the following detailed specification and examining the related drawings, in which:

Fig. 1 shows the essential aspects of my invention, in plan,

Fig. 2 shows the same in sectional elevation,

Figure 3:
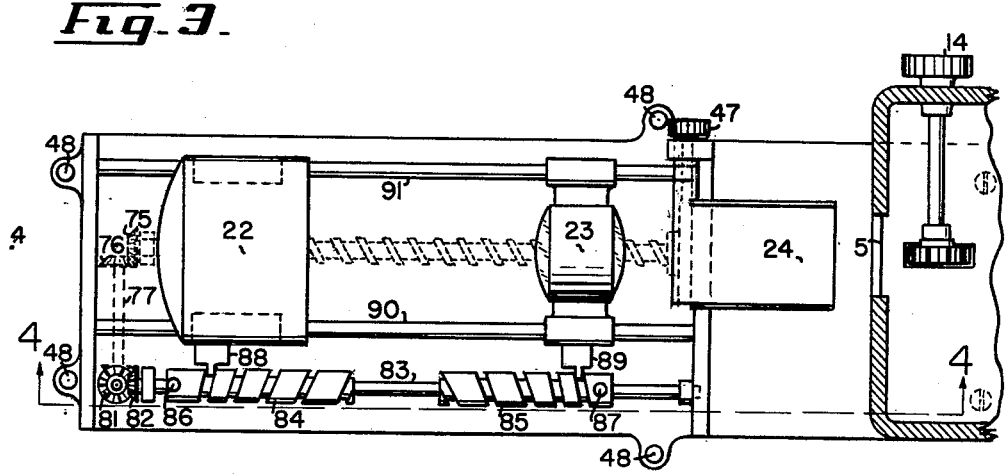
Fig. 3 shows an automatic embodiment of my invention, in plan.

In Fig. 2, numeral 1 represents the divergent primary lens of my main optical system. This coacts with a convergent secondary lens 2 to form an image 3 of object 4 located in the usual field of view. Image 3 is normally formed upon image receiving surface 5, shown obliquely for clarity, such as a light-sensitive motion picture film, the electron-responsive surface of a television camera tube, the sensitized plate in a still camera or the equivalent variants of similar devices.

It is not necessary to describe these known devices in detail; the motion picture film is moved and stored by means known as a motion picture camera; the electron-responsive surface of the camera tube is inclosed in a transparent, evacuated envelope and is provided with electron deflection means, actuating voltages, signal amplifiers and other elements comprising a television camera; the plate or film of the still camera is inclosed in a light-tight box provided with a shutter, iris and so on. Surface 5 may also be a translucent screen for viewing the images formed at that plane or may even be omitted in instances where the image is to be further optically manipulated.

Lenses 1 and 2 comprise the essentials of my commercially available "Electrazoom" lens, described in U. S. Patents 2,506,947; 2,515,104; 2,547,187 and 2,532,685. In the present embodiment these lenses are suitably coaxially mounted and slide along rods 9 and 10 (the latter is directly behind 9 in Fig. 2) for altering the focal length of the combination, i.e., for "zooming." In Figs. 1 and 2 the distance between the lenses is varied manually to provide different magnification and the common distance varied from plane 5 in order to focus object 4 when it is at various distances from my apparatus to image 3 on that plane.

Pinion 6, actuated by knob 7 and meshed with rack 8 is for the purpose of varying the position of lens 2 with sufficient speed and precision to meet the requirements of my invention. Lens 1 is similarly adjusted by pinion 17, actuated by knob 18 and also meshing with rack 8. The common distance is varied by means of pinion 12, rack 13 and knob 14 effecting movement of base 15 with respect to camera housing 16. The position of lens 1 with respect to the focal plane 5 is the major factor in determining the magnification of the system and hence the size of the image, whereas the position of lens 2 determines the focus of the image.

In Fig. 2, slide 19 is a transparency, the image 20 of which it is desired to superimpose on image 3 upon plane 5. Numeral 21 represents a source of radiant energy, say light, and reflector 22 means for efficiently directing this to transparency 19. Converging lens 23 is essentially the same as prior lens 2 and forms the image 20 of transparency 19 upon plane 5. Mirrors 24 and 25, the latter "half"-silvered, direct the illumination twice at right angles as shown in order that superimposition will result. As before, the position of slide 19 is adjusted by pinion 26, actuated by knob 27 engaging rack 28, and the position of lens 23 by pinion 29, actuated by knob 30 also engaging rack 28. Elements 22 and 23 slide on rods 31 and 32, the same in size and relative spacing as rods 9 and 10. It is apparent that several of the elements described have identical or similar size and shape and that economy in manufacturing and servicing will result. In this way I accomplish one of the objects of my invention.

The main frame 15 of my apparatus has essentially two decks with similar elements upon each. These elements will now be further described.

Upon the lower deck, converging lens 2 is shown as composed of three optical elements, a convex-plano lens 33, a double-concave lens 34 and a plano-convex lens 35 to suitably control usual aberrations. I have also found that a good quality single convex lens may be used when some aberration may be tolerated.

"Half-silvered" mirror 25 or the like is preferably constituted to pass nine-tenths of the light from object 4 and to reflect only one-tenth of the light passing through transparency 19. This is because it is relatively easy to provide illumination in the superimposition optical system 21, 22, 36, 19, 37, 38, 39, 40, 24, 25, 5, in comparison to illuminating the field of view containing the object of principal interest 4 when that object is a preformer or a group of performers on an interior stage.

Mirror 25 can be easily prepared by vacuum evaporation, by vacuum sputtering or by the Rochelle (silver) salt process. It is only necessary to interrupt any of these processes considerably prior to the period of time required for forming the usual fully-reflecting mirror. Aluminum may be deposited by vacuum evaporation, as may silver, nickel, chromium and platinum. The degree of reflectivity may be measured by known methods, including that of holding an exposure meter or equivalent successively beneath mirror 25 and in front of surface 5 of Fig. 2 and noting the ratio of the two readings with source 21 operating and other illumination absent. The first reading should be about ten times larger than the second. The reflecting surface of the mirror may be coated with a thin coat of optical lacquer to prevent tarnishing of the first surface and the opposite surface may be given an anti-reflection coating to improve transmission. Mirror 24 is also preferably a first surface mirror but is fully reflecting, being formed by known methods.

Upon the upper deck, element 36 is an opal or frosted glass utilized to diffuse the concentrated illumination from source 21, Other extended sources like a fluorescent one may be used instead. Element 37 is a mask. This is removable like a slide and is used to vary the light intensity over the area of the slide 19 as may be desired. In effect this accomplishes "dodging" as is sometimes used in printing photographic positives. In the present instance the light is reduced over selected areas by increased opacity. This may be complete, as by a suitably cut out slide of metal, bakelite or cardboard, or may be graduated in effect as obtained with paint sprayed upon glass or the equivalent. The purpose is to reduce the light intensity of the superimposed image 20 over areas where image predominent characteristics of the main image 3 of object 4 occur. For instance, it may be desirable to darken the doorway and walk in the foreground of the image of a castle on the superimposition optical system to allow faithful reproduction of actors moving in that part of the scene as viewed by the main optical system. The slots retaining slides 19 and 37 are larger than the slides, which leaf springs 41, 42 hold in place. Adjustment of the position of these elements of the superimposition optical system may thus be accomplished to achieve desirable composition with the image of the main optical system. Equivalent adjusting means known to the art may be employed.

Lens 23 has the same set of optical elements as lens 2 and these may be modified in the same ways previously mentioned for alternate constructions. In addition, the whole lens 23 may be smaller than lens 2, since the light available in the superimposition optical system is normally greater than in the main optical system. The focal lengths of lenses 2 and 23 are desirably the same, I have found, thus the smaller lens 23 would have a larger "f" number and be less optically efficient. The smaller lens is desirable from the standpoint of economy in manufacture.

Mirror 24 is suitably mounted on an extension 43 of base 15 and is steadied by extension 44. Mirror 25 is suitably rotatably mounted on shaft 45, supported by rear wall 46 of frame 15 and on the front wall as well, not shown in Fig. 2, which is a sectional view. A knob 47 fastened to the shaft is for adjusting the position of this mirror, thereby to allow alteration of the composition of the image from the superimposed optical system with respect to that from the main system.

It will be understood that the upper and lower decks of the apparatus may be separately constructed and fastened together for combined operation by thumb screws 48 as shown, or that the apparatus may be constructed in one piece by casting or otherwise. The separate construction is to be preferred when the Electrazoom lens, the lower deck, is to be used separately on numerous occasions.

A circuit for energizing the radiant energy source 21 is required. This takes the form of battery 49 or equivalent A. C. or D. C. source of electrical energy, rheostat 50 and switch 51. The rheostat is provided to adjust the illumination of the superimposition optical system to balance as may be desired the illumination of the main field of view containing object 4. The switch 51 has more than ordinary importance. In the use of the apparatus in television or the like it is often desired that the superimposed material be flashed on and off the screen at precisely timed intervals, as when a commercial message or station call letters are to be exhibited briefly at exactly the correct time in the program. With my apparatus, initial adjustments of the superimposition can be made when the camera involved is not sending the program to the audience, or before the program commences, and at the proper time the superimposition is made by closing the switch and removed by opening it. The wires connected thereto may be of any length so that the process can be accomplished by one removed from the camera, such as the program director or technical director, who have general supervision of the production.

In the general operation of my apparatus, lenses 1 and 2 are positioned apart a distance suited to the desired magnification of the principal object 4. The closer these lenses are positioned, the greater the magnification. Focus of the object 4 as image 3 on plane 5 is accomplished by adjusting the position of both lenses with respect thereto; i. e., by moving base 15 relative to housing 16 by means of knob 14. In the superimposition optical system a desired transparency 19 is put in place as shown, as is a corresponding mask 37 if required, switch 51 is closed, rheostat 50 adjusted and the positions of housing 22 and lens 23 adjusted by turning knobs 27 and 30, respectively. The magnification of the image of the transparency is decreased as elements 22 and 23 are placed farther apart and vice versa, and the focus of superimposed image 20 adjusted by altering the positions of both elements 22 and 23 with respect to the length of the optical path therefrom to the image plane 5. The relative positions of images 3 and 20 can be altered by adjusting the transverse position of transparency 19 and/or mirror 25, or by altering the position and/or angle of the camera with respect to object 4.

The illumination at any point on plane 5 is the sum of the brightnesses of images 3 and 20 at that point. As a practical matter it is desirable to choose background scenes that are relatively dark where the performers shall move or be located, or to accomplish the same thing by a suitable mask 37 already described. For superimposing printing or the like upon a scene the same should be bright and preferably superimposed over a dark area of the main scene. The phenomenon of saturation of the sensitive surface may be invoked in the latter case; the level of combined illumination at the letters exceeding the linear response of the surface, so that the white of the superimposed printing is uniform.

Because mirror 25 is behind lens 2 in this apparatus I am able to accommodate a wide range of change in magnification. Full travel of lens 1 relative to lens 2 is possible. In this way I accomplish one of the objects of my invention. It is also to be noted that because of the comparatively large back focal distance of my lens in relation to an ordinary lens there is room for mirror 25 between lens 2 and surface 5. When my lens, composed of elements 1 and 2, is stationary it functions as an ordinary lens. The focal length of the combination depends upon the relative positions of the elements; it is an adjustable lens. When the elements, principally 1, are moving, a zoom effect is secured and the performance of my apparatus transcends that of an ordinary lens.

We now turn to the automatic embodiment of my invention.

The patents previously identified disclose my automatically adjusted Electrazoom lens. I have found that it is possible to gear my superimposition apparatus to such a lens and to provide a superimposed image which zooms in optical synchronism with the image of the Electrazoom device. This embodiment is shown in Fig. 3 in plan and in Fig. 4 in partial section in elevation.

In these figures, concave lens 1 and convex lens 2 form the main optical system, as before. Convex lens 55 is an additional lens employed to reduce the overall effective focal length of the main optical system. This may be convenient in the practical application of my device and may also be applied to the embodiment of Fig. 2 in a similar position. Conversely, it may be omitted from Fig. 4. In the present instance, lenses 55, 1 and 2 form an image 3 of object 4 upon transducing surface image plane 5. Lenses 1 and 2 are automatically moved required amounts by the cam means shown, as has been described in my previously mentioned patents.

Briefly recounting this structure, reversible motor 56 is energized by the operator at will to vary the magnification of the device. Through gears 57 and 58 worm 59 is caused to revolve. Internally threaded member 60 engages the worm and causes translatory motion of lens 1 and follower 61, these being attached to sleeve 62, one of a pair that slide upon rods 63 and 64, which are spaced apart and fastened to upright portions 66 and 67 of base 65. When motor 56 is actuated in one direction, cam 68 coacting with follower 61 causes an upward motion of cam plate 69 by virtue of pivot 70, and vice versa. Lens 1 having thus moved away from object 4, lens 2 is caused to move toward it by the action of gear teeth 71 formed in plate 69, these being in mesh with rack 72 attached to lens 2. A necessary compensatory motion is thereby imparted to lens 2; a reduced amplitude of travel toward lens 1 when the latter is moving away from object 4 and vice versa. Lens 2 also translates upon rods 63 and 64 or the equivalent. Spring 73 insures that the cam and follower will remain in intimate contact. Base 65 is fastened to the camera housing 16 containing the working focal surface 5 by any suitable means, preferably allowing convenient axial adjustment as shown and as has been previously described in connection with Fig. 2.

Figure 4:
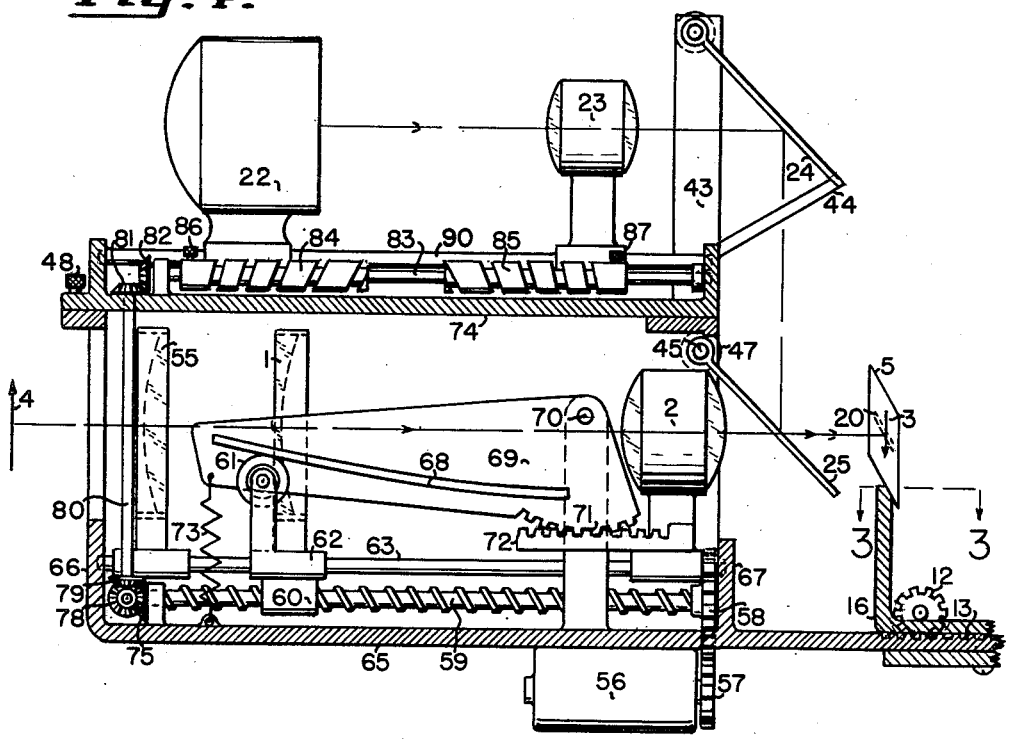
Fig. 4 shows the same in partially sectional elevation.

Turning now to the superimposition aspects of my apparatus, deck 74 is detachably mounted to the upper portion of base 65 of the main optical system, as by thumbscrews 48 engaging lugs as shown in Fig. 3. Deck 74 may, of course, be constructed integral with main base 65 and other variants of the compound case are allowable, as long as the resulting structure is rigid for optical purposes.

Housing 22 contains the light source, reflective surface, diffusing screen, working transparency and mask as was shown in Fig. 2 and previously described, including means associated therewith for energizing the source. Also as before, converging lens 23 is equivalently constituted and positioned.

These elements are automatically adjusted in this embodiment as follows. The forward end of worm 59 of the main optical system is fitted with a bevel gear 75. This meshes with a similar gear 76 mounted on a cross-shaft 77. See Fig. 3. A similar gear 78 on the outboard end of this shaft meshes with still another similar gear 79 which is attached to the lower end of vertical shaft 80. See Fig. 4. Attached to the upper end thereof is another bevel gear 81 which meshes with a similar one 82 on camshaft 83. This gear train may be composed of curved teeth miter gears and the bearings spring loaded so that backlash is eliminated.

Cams 84 and 85 are located along the camshaft, being fastened opposite elements 22 and 23, respectively, by set screws 86 and 87, respectively. Follower 88 is attached to element 22 for the translation thereof by cam 84 and follower 89 is attached to element 23 for the translation thereof by cam 85. Rods 90 and 91 are provided to accommodate this movement and are similarly constituted and spaced as were rods 63 and 64 on the lower deck. As a matter of fact, rod 64 is directly behind rod 63 in Fig. 4 and directly under rod 91 in Fig. 3. It is to be understood that the proportions and placement of many of the elements of my invention may be varied as known to one skilled in the art, within the bounds that the function involved be preserved.

It is apparent from the structure recited that as the motor 56 operates lens elements 1 and 2 it will likewise operate elements 22 and 23. Cams 84 and 85 are cut to provide the proper relative motion. I have found that the motion required is relatively the same for both elements, with the pitch of the spiral of the cam greater as the distance between the elements decreases.

Cams 84 and 85, or either of them, may be altered in position upon camshaft 83 by loosening the corresponding set screws 86 and 87 and manually accomplishing the alteration. By this means I am able to provide any degree of out-of-focus effect of the superimposed image with respect to the main image. When the desired effect is obtained the set screws are tightened and the performance may be repeated automatically. With the set screws remaining loose any special effect may be accomplished manually.

It will be noted that in this embodiment the lens 23 is smaller than lens 2, although of roughly the same focal length, as has been previously described. Also as previously described, first surface mirrors 24 and 25 direct the radiant flux of the superimposition optical system to surface 5, mirror 25 being lightly "half" silvered.

Suitable inclosing side plates may be fitted to my apparatus to exclude ambient light. Also, the external shape of the apparatus may be of dual cylindrical shape, or of ovel cross-section as viewed from the field of view. The moving elements may be driven by worms and cams positioned above rather than below those elements. For unusual effects the transparency may be inserted into element 22 at right angles to usual, or at any angle, or the whole apparatus inclined at any angle to the surface 5. This will result in orientation of the superimposed image, as will be apparent, while the image 3 of the object 4 in the field of view will remain unoriented because of the axial symmetry of the main optical system 55, 1 and 2.

Simulated motion of the superimposed scene can be given to images with my apparatus by manually moving the slide 19, moving cloud and smoke effects by suitably prepared and moved masks 37, and this accomplished automatically by a cam and spring return attachment to these elements. In this way it is possible to give the feeling of airplane flight by moving an airphoto transparency, and so on.

Motion pictures may be utilized as superimposed visual material in the apparatus of this invention by providing a translucent screen in the stead of transparency 19 in the same place and by focusing the image from the usual motion picture projector thereupon. The rear (left) portion of housing 22 may be made detachable should it be desired to project the image from the rear. This merely requires that the housing be made in two parts with the wall containing the lamp 21 flanged and removable from the rest of the body.

In the several above-mentioned ways I accomplish the objects of my invention.

Numerous modifications may be made in the size, proportion, shape and arrangement of parts in my apparatus without departing from the spirit thereof as defined by the following claims:

1. In a coupled duplex optical system for superimposing images, a first group of spaced and aligned elements comprising a diverging primary lens, a converging secondary lens, a transmissive-reflective element and an image surface, a cam for causing motion of said lenses approximately proportionally related to a stationary point between them; a second group of spaced and aligned elements comprising illuminating means, object-holding means, a converging lens for forming a real image of an illuminated object held in said object-holding means upon said image surface by subsequent reflections, and a mirror to direct the illumination forming said real image to said transmissive-reflective element and therefrom to said image surface, a second cam mechanically connected to said first mentioned cam, a follower bearing upon said second cam and attached to said object-holding means, a third cam mechanically connected to said second cam, a follower bearing upon said third cam and attached to said converging lens, said second and third cams defining motions of followers bearing thereupon approximately proportionally related to a stationary point between them, the relation between motions simultaneously imparted by said three cams being such that an image formed upon said image surface by said first group of elements in focus and an image formed upon said surface by said second group of elements in focus remain in focus upon said surface throughout changes in magnification of each said image occasioned by the stated motions of said elements.

2. In an image superimposition optical system; spaced in order along one optical axis, a convergent primary lens, a divergent primary lens, a convergent secondary lens, a transmissive-reflective mirror element, and an image-receiving surface; said lenses adapted to form an image of a field of view, means to move said lenses axially with respect to said surface to focus said image thereon, a follower attached to said divergent primary lens and a cam engaging said follower attached to said secondary lens, said cam shaped to change the magnification of the image on said plane with motion of said divergent primary lens relative to said secondary lens; also spaced in order along a second optical axis substantially parallel to said one optical axis, a source of illumination, a transparency, another convergent lens and a reflective mirror, a second cam kinematically connected to said first cam, a follower adapted to move said transparency in accordance with the contour of said second cam, said other convergent lens positioned to collect the illumination from said source that passed through said transparency, a third cam kinematically connected to said second cam, a follower attached to said converging lens to move it in accordance with the contour of said third cam, said reflective mirror located on the side opposite to said transparency in relation to said converging lens and positioned obliquely to said second optical axis to reflect the illumination passing through said converging lens to said one optical axis at the place occupied by said transmissive-reflective mirror element, said reflective mirror lying substantially parallel to said transmissive-reflective mirror element to cause reflection of said illumination by said transmissive-reflective element to said image-receiving surface; said transparency and said other converging lens positioned to focus an image of said transparency upon said image-receiving surface, and said connected cams adapted to change the magnification of the image of said transparency in synchronism with the change in magnification of the first mentioned system of three lenses caused by the relative motion of said divergent primary lens and said secondary lens as though an image was formed of but one field of view.

References Cited in the file of this patent
UNITED STATES PATENTS

| | | |
|---|---|---|
| 1,636,834 | Peters | July 26, 1927 |
| 1,755,105 | Douglass | Apr. 15, 1930 |
| 1,950,166 | Durholz | Mar. 6, 1934 |
| 2,336,508 | Smith et al. | Dec. 14, 1943 |
| 2,339,780 | Huitt | Jan. 25, 1944 |
| 2,547,187 | Walker | Apr. 3, 1951 |

FOREIGN PATENTS

| | | |
|---|---|---|
| 286,329 | Great Britain | Feb. 28, 1928 |